United States Patent [19]

Almahmoud et al.

[11] 4,403,381
[45] Sep. 13, 1983

[54] METHOD FOR THE MANUFACTURE OF LAYER CAPACITORS

[75] Inventors: Saad Almahmoud, Zeitlarn; Hubert Kraus, Regensburg; Martin Riepl, Poikam, all of Fed. Rep. of Germany

[73] Assignee: Siemens Aktiengesellschaft, Berlin and Munich, Fed. Rep. of Germany

[21] Appl. No.: 254,593

[22] Filed: Apr. 16, 1981

[30] Foreign Application Priority Data

May 7, 1980 [DE] Fed. Rep. of Germany ....... 3017507

[51] Int. Cl.³ ............................................... H01G 4/30
[52] U.S. Cl. ..................................... 29/25.42; 29/423
[58] Field of Search ..................... 29/25.42, 423, 424; 242/56.1; 361/309

[56] References Cited

U.S. PATENT DOCUMENTS 4,263,638 4/1981 Stockman et al. ............. 29/25.42 X

Primary Examiner—Carl E. Hall
Attorney, Agent, or Firm—Herbert L. Lerner; Laurence A. Greenberg

[57] ABSTRACT

Manufacture of layer capacitors wherein several parent windings are wound on top of each other on a drum with separating layers of plastic wound-in between parent windings. The plastic material protrudes from the face surfaces of the parent windings. The face surfaces are covered with a sprayed metal layer. The parts protruding over the sprayed metal layer are removed before dividing the so-formed starting capacitor. The starting capacitor is opened by at least one radial cut, and divided along the parting lines into single parent capacitors. The parent capacitors or parts of the parent capacitors are sawed to form individual capacitors. The separating layers are made of plastic bands which, after the completion of the starting capacitor are brittle, at least in the regions which protrude from the sprayed metal layer. The protruding parts are brushed away, and the separating layers are removed after the division into single parent capacitors.

3 Claims, 1 Drawing Figure

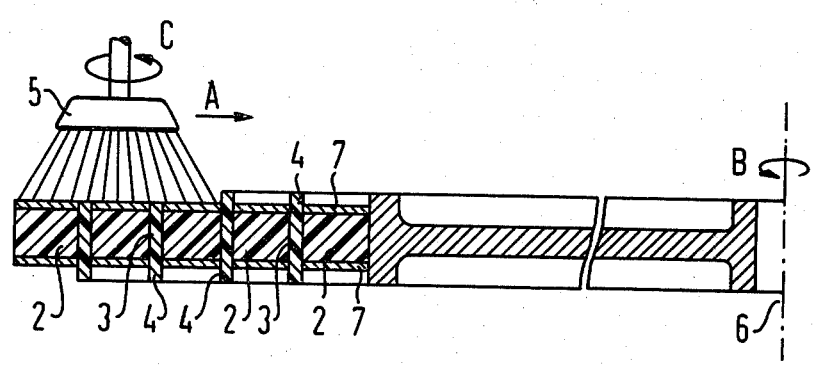

METHOD FOR THE MANUFACTURE OF LAYER CAPACITORS

BACKGROUND OF THE INVENTION

1. Field of the Invention

The instant invention relates to a method for the manufacture of layer capacitors, wherein several patent windings are wound on top of each other on a drum. Separating layers of plastic material are wound-in between two parent or master windings and protrude over the face surfaces of the parent windings. The faces of the so-formed starting winding are completely covered with a sprayed metal layer. The parts which protrude over the sprayed metal layers of the separating layers are removed before dividing the so-formed starting capacitor. The starting capacitor is opened by at least one radial cut, and divided along the parting lines into single parent capacitors, and the parent capacitors or parts of the parent capacitor are sawed to form individual capacitors.

2. Description of the Prior Art

A method of this kind, is known from German Patent DE-PS No. 26 43 087, (U.S. Pat. No. 4,128,927). There, the separating layers which consist of a synthetic material are each cemented to a parent winding. The protruding parts of the separating layers are ground off after the spray-metal layers have been applied. This grinding off after the spray-metal layers according to the state of the art requires bonding the foils to the parent winding, because otherwise the usually tough plastic foils could be pulled out from the capacitor blank during the grinding operation, resulting in a loosening of the winding. The consequence would be an uneven grinding of the face contact-layers, and could lead to impermissible damage of the parent capacitors, because these could move with respect to each other in a starting capacitor that has become loose.

SUMMARY OF THE INVENTION

An object of the instant invention is to provide in a method of the type described a more efficient and economical manufacturing method for the starting capacitor, as well as an economical and complete removal of the ridges (trimming) of the individual parent capacitors.

With the foregoing and other objects in view, there is provided in accordance with the invention, a method for the manufacture of layer capacitors which comprises winding a plurality of parent capacitors on a drum with one capacitor on top of the other, separating the parent capacitors from one another by wound-in separating layers of plastic material which protrude from the face surfaces of the parent windings, completely covering the faces of the thus-formed starting capacitor with a sprayed metal layer, removing the parts protruding over the sprayed metal layers of the separating layers before dividing the thus-formed starting capacitor, said starting capacitor opened by at least one radial cut, and divided into single parent capacitors, the combination therewith of employing as said separating layers, plastic bands which after the completion of the starting capacitor are brittle*, at least in the regions which protrude from the sprayed metal layer, brushing away said brittle protruding parts of the separating layers and removing the separating layers after the division into single parent capacitors.

*e.g. Celluloseacetobutyrate-foil=Trade name "Triafol BN" BAYER AG, or Cellulosetriacetate-foil=Trade name "Triafol TN", BAYER AG. Such materials become brittle at least at temperatures of about 100° C. during the spraying process to form the metal layers on the opposite faces, preferable during an additionally tempering process of the starting capacitors.

Other features which are considered as characteristic for the invention are set forth in the appended claims.

Although the invention is illustrated and described herein as embodied in a method for the manufacture of layer capacitors, it is nevertheless not intended to be limited to the details shown, since various modification may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing in which is diagrammatically illustrated a partial section of parent capacitors wound on a drum and separated by separating layers which protrude from the faces of the capacitors. Also shown is a cup-shaped brush for brushing away the protruding parts.

DETAILED DESCRIPTION OF THE INVENTION

According to the invention the separating layers of plastic bands which result after completion of the starting capacitor are brittle, at least in the regions which protrude from the sprayed metal layer. These protruding parts of the separating layers are removed by a brush. The separating layers are removed after division into individual parent capacitors.

It is advantageous to make the separating layers of celluloseaceto-butyrate foil (film)*. A violet celluloseaceto-butyrate foil is especially advantageous in that it differs colorwise from all conventional capacitor foils. Thereby, its removal can be easily ascertained before the cutting (sawing) of the parent capacitors. The brushing-off operation of the protruding parts is advantageously performed by means of a rotating cup-brush. A cup-brush (cup type brush) whose bristles are conventionally metal wire, is sufficient to remove the protruding ridges at the edges of the spray metal layers of the individual parent capacitors.

*Trade name "Triafol BN", delivered by BAYER AG, Leverkinsen

The starting capacitor is preferably tempered before the cutting operation. A tempering of 2½ hours at approximately 140° C. is sufficient, to cause the foils to become more brittle. This facilitates the brushing operation. The foil breaks away without causing damage (smearing) to the contact layers. The sprayed metal layer may be produced by the Schoop flame process.

The invention will now be further explained with the aid of the drawing which illustrates an example of the method according to the invention.

Referring to the drawing, there are several parent capacitors 2 arranged on a drum with a large diameter. Separating layers 3 protrude over their Schoop-layers 7. The protruding parts 4 are brushed off by a cup-shaped brush 5. The brush 5 rotates in the direction of arrow C, and moves in the direction of arrow A over the capacitors, as shown in the drawing. Simultaneously, the drum 1 rotates in the direction of arrow B. The speeds of the various motion are so adjusted to each other that the protruding portions 4 of the separating layers 3 of the capacitors are completely polished off. Simultaneously, ridges which are formed by the spray of the metal in the region where the separating layers 3 protrude through the Schoop-layers 7 are removed. The drum 1 is constructed symmetrically with respect to the rotation of the rotation axis 6.

There is claimed:

1. In a method for the manufacture of layer capacitors which comprises winding a plurality of parent capacitors on a drum with one capacitor on top of the other, separating the parent capacitors from one another by wound-in separating layers of plastic material which protrude from face surfaces of the parent windings, completely covering the faces of the thus-formed starting capacitor with a sprayed metal layer, removing the parts protruding over the sprayed metal layers of the separating layers before dividing the thus-formed starting capacitor, opening said starting capacitor by at least one radial cut, and dividing said starting capacitor into single parent capacitors, the improvement comprising employing as said separating layers foils of celluloseaceto-butyrate which, after the completion of the starting capacitor are brittle, at least in the regions which protrude from the sprayed metal layer, brushing away said brittle protruding parts of the separating layers by means of a rotating cup-type brush, and removing the separating layers after the division into single parent capacitors.

2. Method according to claim 1, wherein said celluloseaceto-butyrate foil is violet colored.

3. Method according to claim 1, wherein said parent capacitors are cut to form individual capacitors, and wherein said starting capacitor is tempered at approximately 140° C. for about 2.5 hours before said cutting operation.

* * * * *